United States Patent
James et al.

(10) Patent No.: US 11,379,540 B2
(45) Date of Patent: **\*Jul. 5, 2022**

(54) GAIN ADJUSTMENT COMPONENT FOR COMPUTER NETWORK ROUTING INFRASTRUCTURE

(71) Applicant: Google LLC, Mountain View, CA (US)

(72) Inventors: Gavin James, Los Angeles, CA (US); Justin Lewis, Marina Del Rey, CA (US)

(73) Assignee: GOOGLE LLC, Mountain View, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 16/669,269

(22) Filed: Oct. 30, 2019

(65) Prior Publication Data

US 2020/0065337 A1    Feb. 27, 2020

Related U.S. Application Data

(63) Continuation of application No. 15/422,204, filed on Feb. 1, 2017, now Pat. No. 10,496,713.

(51) Int. Cl.
*G06F 7/02* (2006.01)
*G06F 16/00* (2019.01)
(Continued)

(52) U.S. Cl.
CPC .............. *G06F 16/951* (2019.01); *G06F 7/24* (2013.01); *G06F 16/313* (2019.01); *G06F 16/35* (2019.01); *G06Q 30/0256* (2013.01)

(58) Field of Classification Search
CPC .. G06F 16/951; G06F 16/953; G06F 16/9532; G06F 16/9538; G06F 16/313; G06F 16/35; G06F 7/24; G06Q 30/0256
See application file for complete search history.

(56) References Cited

U.S. PATENT DOCUMENTS 7,831,582 B1   11/2010  Scofield et al.
8,386,509 B1   2/2013   Scofield et al.
(Continued)

FOREIGN PATENT DOCUMENTS

CN    102360358.3 A    2/2012

OTHER PUBLICATIONS

"Advertising Keyword Suggestion Based on Concept Hierarchy", dated Jan. 2008 (4 pages).
"Google Keyword Planner: No Nonsense Guide to Finding Awesome Keywords: Chapter 2: How to Use the Google Keyword Planner" (32 pages).

(Continued)

*Primary Examiner* — Bruce M Moser
(74) *Attorney, Agent, or Firm* — Marshall, Gerstein & Borun LLP

(57) ABSTRACT

Systems and methods of a gain adjustment component for content selection infrastructure are provided. The system can receive a selection of multiple topics identified by a semantic analysis technique, and identify one or more keywords. The system can determine relevance scores between each of the keywords and the multiple topics. The system can generate an aggregated relevance score for each keyword based on the relevance score for the keyword and each of the multiple topics. The system can determine a threshold based on a metric associated with the multiple topics. The system can determine to input or exclude each of the one or more keywords based on a comparison of the corresponding aggregated relevance score with the threshold.

20 Claims, 5 Drawing Sheets

(51) Int. Cl.
   *G06F 16/951* (2019.01)
   *G06F 7/24* (2006.01)
   *G06Q 30/02* (2012.01)
   *G06F 16/31* (2019.01)
   *G06F 16/35* (2019.01)

(56) References Cited

U.S. PATENT DOCUMENTS

| | | |
|---|---|---|
| 8,392,396 B1 | 3/2013 | Carver et al. |
| 8,572,114 B1 | 10/2013 | Hubinette |
| 2005/0137939 A1 | 6/2005 | Calabria et al. |
| 2007/0288454 A1 | 12/2007 | Bolivar et al. |
| 2011/0307485 A1 | 12/2011 | Udupa et al. |
| 2012/0059708 A1 | 3/2012 | Galas et al. |
| 2015/0178775 A1 | 6/2015 | Kota |
| 2016/0125462 A1 | 5/2016 | Mallah et al. |
| 2016/0188702 A1 | 6/2016 | Lee-Goldman et al. |
| 2018/0260848 A1* | 9/2018 | Gong .................. G06F 16/9536 |

OTHER PUBLICATIONS

"Google Keyword Tool: Try Our Free, Open Keyword Tools," WordStream (7 pages).
"WordStream's Free Keyword Tool," WordStream (9 pages).
International Preliminary Report on Patentability on PCT Appln. Ser. No. PCT/US2017/034298 dated Aug. 15, 2019 (9 pages).
International Search Report and Written Opinioin on PCT Appln. Ser. No. PCT/US2017/034298 dated Oct. 27, 2017 (14 pages).
International Written Opinion on PCT Appln. Ser. No. PCT/US2017/034298 dated Dec. 7, 2018 (8 pages).
Non-Final Office Action on U.S. Appl. No. 15/422,204 dated Feb. 21, 2019 (14 pages).
Notice of Allowance on U.S. Appl. No. 15/422,204 dated Jul. 31, 2019 (10 pages).
Soulo, Tim, "Keywords Explorer 2.0 by Ahrefs: Setting New Standards for Keyword Research," retrieved from https://ahrefs.com/, dated Nov. 16, 2016 (27 pages).

* cited by examiner

US 11,379,540 B2

GAIN ADJUSTMENT COMPONENT FOR COMPUTER NETWORK ROUTING INFRASTRUCTURE

CROSS-REFERENCES TO RELATED APPLICATIONS

The present application claims the benefit of priority under 35 U.S.C. § 120 as a continuation of U.S. patent application Ser. No. 15/422,204, titled "GAIN ADJUSTMENT COMPONENT FOR COMPUTER NETWORK ROUTING INFRASTRUCTURE," filed Feb. 1, 2017, which is incorporated herein by reference in its entirety.

BACKGROUND

Excessive network transmissions, packet-based or otherwise, of network traffic data between computing devices can prevent a computing device from properly processing the network traffic data, completing an operation related to the network traffic data, or timely responding to the network traffic data. The excessive network transmissions of network traffic data can also complicate data routing or degrade the quality of the response if the responding computing device is at or above its processing capacity, which may result in inefficient bandwidth utilization. The control of network transmissions corresponding to content item objects can be complicated by the large number of content item objects that can initiate network transmissions of network traffic data between computing devices.

SUMMARY

At least one aspect is directed to a gain adjustment system infrastructure. The system can be directed to gain adjustment of content selection infrastructure. The system can include a data processing system. The data processing system can include a gain adjustment component and a content selector component executed by at least one processor. The data processing system receive a selection of a plurality of topics generated by a semantic analysis engine. The plurality of topics can include a first topic and a second topic. The data processing system can determine a first relevance score between a first keyword and the first topic. The data processing system can determine a second relevance score between the first keyword and the second topic. The data processing system can determine a third relevance score between a second keyword and the first topic. The data processing system can determine a fourth relevance score between the second keyword and the second topic. The data processing system can determine a first aggregated score based on the first relevance score and the second relevance score. The data processing system can determine a second aggregated score based on the third relevance score and the fourth relevance score. The data processing system can identify a threshold based on a metric corresponding to the plurality of topics. The data processing system can input, responsive to the first aggregated score greater than the threshold, the first keyword into a content selection process executed by the content selection infrastructure. The data processing system can exclude, responsive to the second aggregated score less than the threshold, the second keyword from the content selection process executed by the content selection infrastructure. The data processing system can select, via the first keyword of the content selection process executed by the content selection infrastructure, a content item to provide for display on the client computing device. The data processing system can select the content item in response to a request received from a client computing device.

At least one aspect is directed to a method of adjusting gain in content selection infrastructure. The method can include a data processing system receiving a selection of a plurality of topics generated by a semantic analysis engine, the plurality of topics comprising a first topic and a second topic. The method can include the data processing system determining a first relevance score between a first keyword and the first topic. The method can include the data processing system determining a second relevance score between the first keyword and the second topic. The method can include the data processing system determining a third relevance score between a second keyword and the first topic. The method can include the data processing system determining a fourth relevance score between the second keyword and the second topic. The method can include the data processing system determining a first aggregated score based on the first relevance score and the second relevance score. The method can include the data processing system determining a second aggregated score based on the third relevance score and the fourth relevance score. The method can include the data processing system identifying a threshold based on a metric corresponding to the plurality of topics. The method can include the data processing system inputting, responsive to the first aggregated score greater than the threshold, the first keyword into a content selection process executed by the content selection infrastructure. The method can include the data processing system excluding, responsive to the second aggregated score less than the threshold, the second keyword from the content selection process executed by the content selection infrastructure. The method can include the data processing system selecting, via the first keyword of the content selection process executed by the content selection infrastructure, in response to a request received from a client computing device, a content item to provide for display on the client computing device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
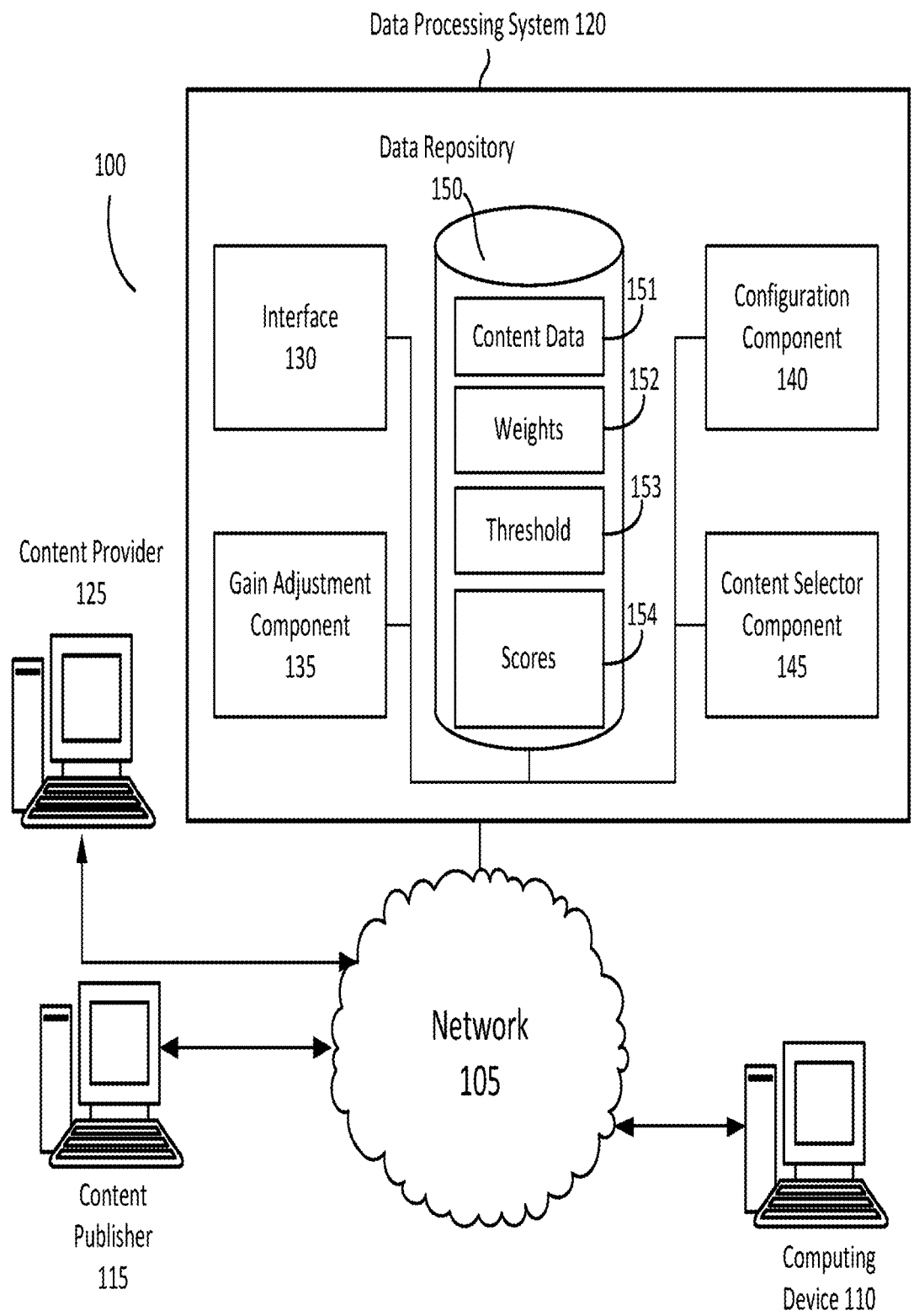
FIG. 1 is an illustration of a gain adjustment system for content selection infrastructure.

Following below are more detailed descriptions of various concepts related to, and implementations of, methods, apparatuses, and systems of parameterizing network communication paths. The various concepts introduced above and discussed in greater detail below may be implemented in any of numerous ways.

A data processing system including one or more servers or computing devices used to process content item placement campaigns can consume significant computing resources performing real-time content selection processes (e.g., ad auctions) for content items that are not going to be selected either by the data processing system or by the user that receives the selected ad. Data processing systems can consume significant computing resources as content providers perform searches for relevant keywords, or requests recommendations for relevant keywords from the data processing system. Additional computing resources can be utilized as content providers scroll down the list of keyword results because each new page view causes the data processing system to perform another search process or remote procedure call ("RPC"). Keyword generation can be vulnerable to fraud, pollution from attempts at search engine optimization, link farming and similar malicious techniques that provide many fraudulent incoming links. The data processing system may expend a considerable amount of resources on detecting fraudulent attempts at manipulating keyword generation.

Systems and methods of the present solution provide a data processing system that can reduce processor utilization, memory utilization, remote procedure calls, and bandwidth usage by providing a gain adjustment component for a machine learning-based decision tool that improves content selection infrastructure. The gain adjustment component can facilitate selecting parameters that can improve the efficiency and performance of the content selection infrastructure, while reducing remote procedure calls, pagination, memory utilization, and processor utilization.

Configuring content selection infrastructure can be challenging due to the numerous parameters to be selected based on a desired function. A configuration tool or component can be used to generate, adjust, or otherwise set parameters used to configure the content selection infrastructure based on the desired function. However, it may further be challenging to calibrate or tune the configuration tool in order to generate the parameters to further the desired function when input into the content selection infrastructure.

Systems and methods of the present solution provide a data processing system comprising a gain adjustment component to facilitate tuning or calibrating the configuration tool used to generate parameters for input into the content selection infrastructure. The configuration tool can utilize a semantic analysis tool or other machine learning technique to identify concepts and keywords based on the concepts, or exclude keywords corresponding to undesired concepts. Keywords can be included or excluded using a threshold. For example, if a keyword's relevance score with respect to a concept is greater than or equal to a threshold, then the keyword can be included. If the keyword's relevance score with respect to a concept is less than the threshold, then the keyword can be excluded. However, it may be challenging to tune the threshold, or dynamically tune the threshold, based on the desired function or desired network activity level. Tuning the threshold can refer to adjusting the gain of the system to satisfy the desired function or network activity level.

The present solution provides a data processing system with a gain adjustment mechanism that can combine multiple relevance scores of a keyword for each selected topic in a candidate condition decision. The data processing system can receive a selection of multiple topics and process vectors or relevance scores associated with the multiple concepts in order to generate or identify a single parameter, such as a keyword, for input into, or use by, the content selection infrastructure. For example, if the data processing system receives a selection of two or more topics, the data processing system can determine to include fringe keywords only if the fringe keywords are related to multiple selected topics.

Thus, the data processing system of the present solution can reduce the number of search, browse, and continuation queries content provider's need to commit in order to find the appropriate list of keywords for their content selection process. This reduces network requests as well as server side CPU and memory costs. Additionally, since this data processing system can narrow the set of recommended keywords, the data processing system can also reduce response size which further reduces network bandwidth utilization as well as CPU and memory utilization on the client device.

FIG. 1 illustrates an example system 100 for configuring content selection infrastructure using a gain adjustment component. The system 100 can include content selection infrastructure. The system 100 can include a data processing system 120 communicating with one or more of a content provider computing device 125, content publisher computing device 115 or client computing device 110 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be displayed on at least one computing device 110, such as a laptop, desktop, tablet, personal digital assistant, smart phone, or portable computers. For example, via the network 105 a user of the computing device 110 can access web pages provided by at least one web site operator or content publisher 115. A web browser (e.g., resource, application or agent) of the computing device 110 can access a web server of the web site operator or content publisher 115 to retrieve a web page for display on a monitor of the computing device 110. The content publisher 115 can provide instructions to the resource executing on the computing device 110 to render the content. The web site operator or content publisher 115 generally includes an entity that operates the web page. The web site operator or content publisher 115 includes at least one web page server that communicates with the network 105 to make the web page available to the computing device 110. The data processing system 120 can provide instructions to the resource executing on the computing device 110 to render content.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireline network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 120. The data processing system 120 can include at least one logic device such as a computing device having a processor to communicate via the network 105, for example with the computing device 110, the web site operator or content publisher computing device 115 (or content publisher 115), and at least one content provider computing device 125 (or provider device 125 or content provider 125). The data processing system 120 can include at least one computation resource, server, processor or memory. For example, the data processing system 120 can include a plurality of computation resources or servers located in at least one data center. The data processing system 120 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The data processing system 120 can include a content placement system having at least one computation resource or server. The data processing system 120 can include at least one interface 130, at least one gain adjustment component 135, at least one configuration component 140, at least one content selector component 145, and at least one data repository 150. The at least one data repository 150 can include or store, in one or more data structures or data bases, content data 151, weights 152, thresholds 153, or scores 154 (e.g., relevance scores). Content data 151 can include, for example, content campaign information, content groups, content selection criteria, content item objects or other information provided by a content provider 125 or obtained or determined by the data processing system to facilitate content selection. The interface 130, gain adjustment component 135, configuration component 140, and content selector component 145 can each include at least one processing unit or other logic device such as programmable logic array engine, or module configured to communicate with the database repository or database 150. The interface 130, gain adjustment component 135, configuration component 140, and content selector component 145 and data repository 150 can be separate components, a single component, or part of the data processing system 120. The system 100 and its components, such as a data processing system 120, may include hardware elements, such as one or more processors, logic devices, or circuits.

The data processing system 120 can obtain anonymous computer network activity information associated with a plurality of computing devices 110. A user of a computing device 110 can affirmatively authorize the data processing system 120 to obtain network activity information corresponding to the user's computing device 110. For example, the data processing system 120 can prompt the user of the computing device 110 for consent to obtain one or more types of network activity information. The identity of the user of the computing device 110 can remain anonymous and the computing device 110 may be associated with a unique identifier (e.g., a unique identifier for the user or the computing device provided by the data processing system or a user of the computing device). The data processing system can associate each observation with a corresponding unique identifier.

A content provider 125 may establish an electronic content campaign with one or more parameters, such as keywords or other selection criteria. An electronic content campaign can refer to one or more content groups that correspond to a common theme. A content campaign can include a hierarchical data structure that includes content groups, content item data objects, and content selection criteria. To create a content campaign, content provider 125 can specify values for campaign level parameters of the content campaign. The campaign level parameters can include, for example, a campaign name, a preferred content network for placing content item objects, a budget for the content campaign, start and end dates for the content campaign, a duration for the content campaign, a schedule for content item object placements, language, geographical locations, content selection criteria, keywords, type of computing devices on which to provide content item objects. Other campaign level parameters can include, for example, a payment technique such as a cost-per-click (CPC), cost per thousand impressions (CPM), cost-per-action (CPA), cost-per-conversion, or cost per thousand conversions. An impression can refer to when a content item object is fetched from its source (e.g., data processing system 120 or content provider 125), and is countable. Due to the possibility of click fraud, robotic activity can be filtered and excluded, as an impression. Thus, an impression can refer to a measurement of responses from a Web server to a page request from a browser, which is filtered from robotic activity and error codes, and is recorded at a point as close as possible to opportunity to render the content item object for display on the computing device 110. An impression can refer to a viewable impression; e.g., the content item object is at least partially (e.g., 20%, 30%, 30%, 40%, 50%, 60%, 70%, or more) viewable on a display device of the client computing device 110. A click or selection can refer to a user interaction with the content item object, such as a mouse-click, touch interaction, gesture, shake, audio interaction, or keyboard click. A conversion can refer to a user taking a desired action with respect to the content item objection; e.g., purchasing a product or service, completing a survey, visiting a physical store corresponding to the content item, or completing an electronic transaction.

The content provider 125 can further establish one or more content groups for a content campaign. A content group includes one or more content item objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the content item in the presence of the negative keyword on main content), bids for keywords, or budget.

To create a new content group, the content provider can provide (e.g., via interface 130) values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider 125 can use to capture a topic or subject matter for which content item objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The content provider 125 can provide (e.g., via interface) one or more keywords and content item objects to each content group. Keywords can include terms that are relevant to the product or services of associated with or identified by the content item objects. A keyword can include one or more terms or phrases. For example, the car dealership may include "sports car," "V-6 engine," "four-wheel drive," "fuel efficiency," as keywords for a content group or content campaign. Negative keywords can be specified by the content provider to avoid, prevent, block, or disable content placement on certain search result webpages or content webpages matching those negative keywords. The content provider can specify a type of matching, such as exact match, phrase match, or broad match, used to select content item objects.

The content provider 125 can provide one or more content item objects for selection by the data processing system 120. The data processing system 120 can select the content item objects when a content placement opportunity becomes available that matches the budget, content schedule, maximum bids, keywords, and other selection criteria specified for the content group. Different types of content item objects can be included in a content group, such as a text content item, an image content item, video content item, audio content item, multimedia content item, call content item, or content item link.

Configuring content selection infrastructure can be challenging due to the numerous parameters to be selected based on a desired function. A configuration tool or component cab generate, adjust, or otherwise set parameters used to configure the content selection infrastructure based on the desired function. However, it may be further challenging to calibrate or tune the configuration tool in order to generate the parameters to further the desired function when input into the content selection infrastructure.

The data processing system 120 of the present solution includes a gain adjustment component 135 to facilitate tuning or calibrating the configuration tool used to generate parameters for input into the content selection infrastructure. The configuration tool can utilize a semantic analysis tool or other machine learning technique to identify concepts and keywords based on the concepts, or exclude keywords corresponding to undesired concepts. Keywords can be included or excluded using a threshold. For example, if a keyword's relevance score with respect to a concept is greater than or equal to a threshold, then the keyword can be included. If the keyword's relevance score with respect to a concept is less than the threshold, then the keyword can be excluded. However, it may be challenging to tune the threshold, or dynamically tune the threshold, based on the desired function or desired network activity level. Tuning the threshold can refer to adjusting the gain of the system to satisfy the desired function or network activity level.

The data processing system 120 can include, execute, or communicate with an interface 130. The interface 130 can include, for example, a graphical user interface with one or more input text boxes, buttons, drop down menus, widgets or other user interface elements. The data processing system 120 can provide the graphical user interface for rendering on a content provider device 125. The data processing system 120 can receive, via the interface 130, parameters or other information that facilitates a content selection process or establishing a content selection process.

The interface 130 can include a dynamic interface. The dynamic interface can provide information responsive to input received from the content provider device 125. The interface 130 can forward or route data packets received from the content provider device 125 to one or more component of the data processing system 120, such as the gain adjustment component 135, configuration component 140, content selector component 145 or data repository 150. The interface 130 can include a network interface, user interface, input/output interface, communications port, a bus, or other software or hardware to provide data packets or information to a content provider device 125, content publisher device 115 or computing device 110, and receive data packets or information from the content provider device 125, content publisher device 115 or computing device 110.

The data processing system 120 can include a configuration component 140. The configuration component 140 can be designed and constructed to facilitate configuration the data processing system 120, content selection infrastructure, or content selection process implemented or executed by the data processing system 120. The configuration component 135 can be part of or otherwise interface with one or more component of the data processing system 120. For example, the configuration component 140 can be integrated with, or a part of, the content selector component 145.

The configuration component 140 can instruct the interface 130 to provide, for rendering on the content provider device 125, a graphical user interface. The configuration component 140 can prompt the content provider device 140 for information, such as parameters or content selection criteria. The configuration component 140 can provide recommendations or suggestions for parameters. The configuration component 140 can provide recommendations based on data packets or information received from the content provider 125, or information detected by the data processing system 120. For example, the data processing system 120 can monitor network activity associated with one or more client computing devices 110 that indicates a network interaction with content item objects provided by the content provider 125. The data processing system can process the monitored network activity to generate a recommendation for a parameter or content selection criteria that can be used to select the content item objects for display on subsequent web pages, for example.

When setting up a content selection process for a content provider device 125, the data processing system 120 can receive a selection of one or more topics. The selection of the plurality of topics can be provided by the content provider device 125. For example, the content provider device 125 can indicate, via the graphical user interface provided by the interface 130, one or more topics.

The data processing system 120 can receive, as input, a set of topics. Topics can refer to, for example, machine learned topics based on clustering keywords with similar network activity or network interactions. Topics can refer to concepts generated via semantic analysis techniques. Topics can refer to artificial topics such as a topic built manually by the content provider 125 using seed keywords. The data processing system 120 can use the selected topics to generate an output with a ranked set of keyword recommendations. The keyword recommendations can fall into two buckets: 1) keywords that are closely related to one of the selected topics; and 2) keywords that fit in between the multiple selected topics.

The data processing system 120 can include a gain adjustment component 135 designed and constructed to determine relevance scores, determine aggregate relevance scores, determine a threshold, and rank parameters. The gain adjustment component 135 can be part of or otherwise interface with one or more component of the data processing system 120. For example, the gain adjustment component 135 can be integrated with, or a part of, the configuration component 140 or the content selector component 145. The gain adjustment component 135 can facilitate generating the output of keywords that fall into the two buckets: 1) keywords that are closely related to one of the selected topics; and 2) keywords that fit in between the multiple selected topics.

The data processing system 120 can identify one or more keywords. The data processing system 120 can identify the one or more keywords based on the topics selected by the content provider device 125. The data processing system 120 can retrieve, identify, or otherwise obtain the keywords. The data processing system 120 can obtain the keywords from the data repository 150. For example, the topic selected by the content provider device 125 can be associated with one or more keywords, a set of keywords, or a keyword cluster. A semantic analysis tool or machine learning engine can identify or select one or more keywords associated with the topic or related to the topic. The data processing system 120 can access a data repository or database remote from the data processing system 120 to retrieve or obtain one or more keywords.

The data repository 150 can include, for example, a plurality of keywords associated with a topic. The data repository 150 can include a plurality of keywords associated with each of one or more topics, including each topic selected by the content provider device 125. The data repository 150 can be pre-populated with the keywords, and each of the keywords can be associated with a corresponding topic. The data repository 150 can be pre-populated with keywords. The data repository 150 can be pre-populated with keywords by end users, administrators of the data processing system 120, content providers 125, content publishers 115 or client computing devices 110. The data processing system 120 can receive keywords via crowd sourcing techniques, as well as an association between a keyword and a topic.

The data processing system 120 can receive, via a front end interface 130, an indication of a seed keyword provided by the content provider device 125. The data processing system 120 can extract, from the seed keyword via the semantic analysis technique, at least one of the plurality of topics. For example, the data processing system 120 can receive a seed keyword such as "baseball" and extract from it a topic such as "sports".

For each topic, the data processing system 120 can identify relevant keywords, related keywords, or other list of keywords. The data processing system 120 can determine a relevance score between a keyword and a topic. The data processing system 120 can use a semantic analysis technique, machine learning engine, or other technique to determine a relevance score between a keyword and a topic. The data processing system 120 can retrieve the relevance score from a data structure stored in the data repository 150 that contains relevance scores for each keyword with respect to a topic.

The relevance score can include a value, indication of degree, text, or other indication of an amount of relevancy. The relevance score can include a numeric value, such as 0 to 1, 0 to 10, 0 to 100 or some other range. The relevance score can include a grade, such as A, B, C, or D; or indication of low, medium or high.

The data processing system can be configured with one or more techniques to determine the relevance score. For example, the data processing system can determine a "distance" in a semantic graph. Depending on the structure of the graph, distance can refer to the number of edges (links) between the core nodes in the topic and the node of the keyword. Distance can refer to the graphical notion flow from the core of the topic to the keyword, which can include or take into account the number of alternate paths in the graph which are less than a specified length that connect the keyword to the core cluster. The data processing system 120 can use other graph-based distance techniques.

The data processing system 120 can determine a distance without using a semantic graph. For example, the data processing system 120 can determine the distance based on the lines of co-occurrence metrics, such as on the web or network. The lines of co-occurrence metrics can be used to determine the distance of a keyword from the topic. These statistics can be modified by inverse document frequency to account for common/uncommon terms. The data processing system 120 can use other statistical techniques.

The data processing system 120 can identify a plurality of topics, including a first topic and a second topic. The data processing system 120 can identify a plurality of keywords based on each of the topics, including a first keyword and a second keyword. The data processing system 120 can determine a relevance score between each keyword and each topic. For example, the data processing system 120 can determine a first relevance score between the first keyword and the first topic, and a second relevance score between the first keyword and the second topic. The data processing system 120 can determine a third relevance score between the second keyword and the first topic, and a fourth relevance score between the second keyword and the second topic.

For each keyword, the data processing system can generate, calculate, or determine an aggregated relevance score. The data processing system 120 can determine the aggregated relevance score using the independent relevance score for each keyword and topic pair (e.g., a first score for the keyword and first topic; second score for the same keyword and a different, second topic; and third score for the same topic and a different, third topic). The data processing system 120 can determine the aggregated relevance score by combining two or more relevance scores for the keyword. The data processing system 120, for example, can combine the first relevance score with the second relevance score to generate a first aggregated relevance score; and combine the third relevance score with the fourth relevance score to generate a second aggregated relevance score.

The data processing system can identify keywords based on negative topic suggestions. By selecting a topic as a negative, the data processing system can either exclude keywords that are related to the negative topic, or identify keywords to use as negative keywords configured to block a content item from being selected for display on a web page having main content containing the negative keyword.

The data processing system 120 can filter out or remove one or more keywords to generate a subset of keywords for which to generate aggregate relevancy scores. The data processing system 120 can use a threshold (e.g., first filter threshold, first gain adjustment threshold, single topic threshold) to determine which keywords to filter out, remove, exclude, delete, or otherwise not further process based on a relevance score of the keyword. The data processing system 120 can exclude the keyword from the content selection process, not include the keyword, not recommend the keyword, disable the keyword, or otherwise not use the keyword to select one or more content items of the content provider 125. For example, the data processing system 120 can identify a first set of five keywords that are each associated with a first topic, and a second set of five keywords that are associated with a second topic. The data processing system 120 can determine that one or more of the keywords of the first and second sets of keywords have relevance scores for both the first topic and the second topic that satisfy a filter threshold (e.g., a numeric value from 0 to 1, 0 to 10, 0 to 100, or alphanumeric value, or letter grade).

For example, the data processing system 120 can determine that three of the keywords in the first of five keywords overlap (e.g., by having relevance scores with both the first topic and the second topic that satisfy the filter threshold) with three of the keywords in the second set of keywords. The first set of five keywords can overlap with the second set of five keywords by having the same three keywords. The data processing system 120 can identify the overlapping three keywords, and proceed with processing the overlapping three keywords while removing or excluding the non-overlapping two keywords in the first set of keywords and the non-overlapping two keywords in the second set of keywords. Thus, the data processing system 120 can determine aggregate relevance scores for the three overlapping keywords that are present in both the first set of keywords and the second set of keywords, while not processing the remaining four keywords. By filtering out the remaining four set of keywords, the data processing system 120 can reduce resource utilization (e.g., reduce processor utilization by not determining aggregate relevancy scores for the filtered out keywords; reduce network bandwidth utilization by not transmitting the filtered out four keywords to a content provider device 125; and reduce memory utilization by not keeping the relevance scores and other information associated with the four filtered out keywords in cache or other high speed memory).

The data processing system 120 can use a static filter threshold, dynamic filter threshold, or filter threshold tailored or customized for a topic or a combination of topics. The data processing system 120 can store the filter threshold in a threshold data structure 153 stored in the data repository 150. The filter threshold can be higher for some topics, and lower for other topics. The data processing system 120 can adjust or set the filter threshold based on information received from the content provider 125, based on feedback from the content provider device 125, or based on performance feedback as determined by processing network activity data packets detected and monitored by the data processing system 120. For example, the data processing system 120 can determine how keywords selected using the filter threshold perform in a content selection process and the type of network activity that occurred on the computing device 110 in response to content item objects selected via the keyword and transmitted for rendering or display on the computing device 110.

Thus, the data processing system 120 can determine, for each keyword in the intersection of a set of topics, an aggregated score. The data processing system 120 can use one or more techniques to generate an aggregated relevance score.

The data processing system can be configured with one or more techniques for combining the relevance scores. For example, a first technique can include an additive technique, multiplicative technique, or bucketing. The same keyword can have multiple meanings, and a single keyword can have multiple relevance scores for any given topic for each of the different meanings. The data processing system can evaluate keywords for each of their different meanings. The data processing system, however, can use the aggregated relevance scores for the same meaning. By using the aggregated relevance scores for the same meaning, the data processing system can remove normalization bias that comes from the same keywords being attributed to different meanings.

For example, the data processing system 120 can use an additive technique. In the additive technique, the data processing system can average the relevance scores of the keyword for each of the topics. The data processing system can compare this average against a threshold which is lower than the threshold for a single topic. For example, the data processing system 120 can combine the first relevance score with the second relevance score by dividing the sum of the two relevance scores by two to determine the average relevance score or aggregated relevance score. In another example, if there are N topics and N relevance scores, the data processing system 120 can add the N relevance scores together to determine a sum of the N relevance scores, and divide the sum of the N relevance scores by N to determine the average.

The data processing system 120 can use a multiplicative technique to generate an aggregated relevance score. The multiplicative technique can be similar to the additive technique, except instead of adding the individual scores together, the data processing system can multiply the individual scores together. By multiplying the scores together, the score can be disproportionately increased more by all values being moderately high instead of a single value being high and the other value(s) being low. The multiplicative technique can narrow positive results to keywords that are relevant to all of the topics rather than keywords that are very near relevant for a single topic.

In the multiplicative technique, the data processing system 120 can multiply the relevance scores for a keyword and then divide the product by the number of topics to generate the aggregated relevance scores. The data processing system 120 can multiply the relevance scores for a keyword without dividing the product by the number of topics such that the aggregated relevance score is the product of the relevance scores for the keyword.

The data processing system 120 can use bucketing to determine the relevance score and combine multiple relevance scores. Bucketing can refer to transforming the relevance score for a keyword and topic to a different value or category. For example, the data processing system 120 can bucketize scores using three buckets as follows: relevance scores between 0.7 and 0.9 can assigned a bucketized relevance score of 1; relevance scores of between 0.4 and 0.6 can be assigned a bucketized relevance score of 0.5; and relevance scores between 0.1 to 0.3 can be assigned a bucketized relevance score of 0. Bucketing can reduce the granularity of the relevance scores. Bucketing can reduce a high relevance score (e.g., 1.5 or above 1) to a lower bucketized relevance score of 1. Bucketing can prevent a single keyword score from excessively increasing the aggregated relevance score. Bucketizing relevance scores can reduce complexity of calculations or further filter out more keywords by assigning them a zero relevance score which, when combined in the multiplicative technique, for example, can lower the aggregated score to zero or otherwise below a threshold.

Bucketing can include comparing the keyword's relevance score individually to a lower threshold for each topic. The data processing system 120 can consider the keyword a candidate based on the number of topics for which the keyword individually passes the lowered relevance score. Using the bucketing technique, the data processing system 120 may not over value high scoring keywords. The bucketing technique can be combined with the additive technique or the multiplicative technique in order to generate scalar values. Bucketing can improve the run speed of the calculations or operations, thereby improving performance of the data processing system or gain adjustment mechanism. Bucketing can improve performance by ignoring permutations where the keyword relevance score does fit within the lower match threshold for a particular topic.

The data processing system 120 can utilize the bucketing technique in conjunction with the additive technique or the multiplicative technique in order to generate the aggregated relevance score. For example, the data processing system 120 can bucketize one or more relevance scores for a keyword, and then apply the additive technique or the multiplicative technique to the bucketized relevance scores to generate the aggregated relevance score for the keyword. The data processing system 120 can apply bucketing to some or all relevance scores for some or all of the keywords.

The data processing system 120 can apply a weight to a relevance score. The data processing system 120 can weight relevance scores based on the topic. The data processing system 120 can receive weights from a content provider device 125, or the retrieve the weights from a weight data structure 152 stored in data repository 150. The data processing system 120 can apply different weights based on the topics such that the score for the topic is more heavily weighted and plays a greater factor when determining the aggregate relevancy score. For example, the first topic can include a weight that is a multiplier of 2 and the second topic may not have a weight or have a weight multiplier of 1. The data processing system 120 can multiply the relevance scores for a keyword and the first topic by 2, which can cause the first topic to be more heavily weighted than the second topic. The data processing system 120 can reduce the weight of a topic by using a weight multiplier of less than 1. The weight can be an additive weight, such as by adding a score of 0.2 across all relevance scores for a topic.

The data processing system 120 can select one or more keywords based on the aggregate relevance score for the keyword satisfying a threshold (e.g., second filter threshold, second gain adjustment threshold, multi-topic threshold). An aggregate relevance score can satisfy a threshold if the aggregate relevance score is greater than or equal to the threshold. The aggregate relevance score can satisfy a threshold if the aggregate relevance score is less than or equal to the threshold.

The data processing system 120 can identify a threshold based on a metric corresponding to the plurality of topics. The data processing system 120 can determine the metric based on the number of topics. For example, the data processing system 120 can increase or decrease the threshold based on the number of topics. The data processing system 120 can use a function to determine the threshold. The function can receive, as an input, the number of topics. The function used to determine the threshold can vary based on the technique used to generate the aggregated relevance score. The data processing system 120 can use the same function to determine the threshold for each of the techniques used to generate the aggregated relevance score.

For example, the data processing system 120 can determine a lower threshold as the number of topics increase in order to improve the likelihood of identifying a keyword with an aggregated relevance score that satisfies the threshold. The data processing system 120 can use a higher threshold as the number of topics decrease. The data processing system 120 can use a higher threshold as the number of topics increase in order to improve the likelihood that the keyword selected, based on the aggregate relevance score satisfying the threshold, is relevant to the multiple topics.

Different topics can have the same or different thresholds. For example, a content provider device 125 can indicate a gain adjustment threshold to cause the data processing system 120 to identify more or less closely related keywords for a certain topic. The gain adjustment threshold can be used to weight topics when determining the aggregate relevance score, or select keywords based on the aggregate relevance score. By providing different thresholds for different topics, the gain of the data processing system 120 can be adjusted such that the keywords that are generated have a desired relevance score or aggregated relevance score, thereby reducing resource utilization.

Thus, the data processing system 120 can identify or select one or more keywords to input into a content selection process based on the aggregate relevance score of the keyword satisfying a gain adjustment threshold. The data processing system 120 can identify one or more keywords to exclude from the content selection process based on the keyword not satisfying the gain adjustment threshold (e.g., being filtered out by the first gain adjustment threshold or the second gain adjustment threshold). The first gain adjustment threshold can be a single-topic threshold, while the second gain adjustment threshold can be a multi-topic threshold.

The data processing system 120 can identify one or more keywords having aggregate relevance scores that satisfy the threshold. The data processing system 120 can input the identified one or more keywords into a content selection process executed by content selection infrastructure. The data processing system 120 can use the identified and selected one or more keywords to select content item data objects of the content provider 125. The selected content item object can be transmitted to a client computing device 110 to cause the client computing device 110 to render the content item object for display via a display device of the content provider device 110, or to otherwise present the selected content item object to an end user of the client computing device 110.

The data processing system 120 can rank a plurality of keywords having aggregate relevance scores that satisfy the threshold, and transmit the ranked keywords for display on the content provider device 125. The data processing system 120 can normalize the aggregated relevance scores for a topic. The data processing system 120 can rank or sort the aggregate relevance score based on the number of topics or which topics the aggregate relevance score correspond to. The data processing system 120 can transmit the ranked keywords via interface 130 to the content provider device 125. The content provider device 125 can select one or more of the ranked keywords for inclusion in a content selection process configured to select content item objects provided by the content provider device 125.

The data processing system 120 can include, execute, or otherwise communicate with a content selector component 145 to receive and select, based on the keyword, a content item via a real-time content selection process. The content selection process can refer to, or include, selecting sponsored content item objects provided by third party content providers 125. The real-time content selection process can include a service in which content items provided by multiple content providers are parsed, processed, weighted, or matched in order to select one or more content items to provide to the computing device 110. The content selector component 145 can perform the content selection process in real-time. Performing the content selection process in real-time can refer to performing the content selection process responsive to the request for content received via the client computing device 110. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 110, or within a time interval after the communication session is terminated.

For example, the data processing system 120 can include a content selector component 145 designed, constructed, configured or operational to select content item objects. To select content items for display, the data processing system 120 can use keywords to select a matching content item based on a broad match, exact match, or phrase match. For example, the content selector component 145 can analyze, parse, or otherwise process subject matter of candidate content items to determine whether the subject matter of the candidate content items correspond to the subject matter of the keywords or phrases associated with the request for content from the computing device 110 (e.g., keywords associated with main content of a web page or a search query input into a search engine). The content selector component 145 can identify, analyze, or recognize terms, characters, text, symbols, or images of the candidate content items using an image processing technique, character recognition technique, or database lookup. The candidate content items may include metadata indicative of the subject matter of the candidate content items, in which case the content selector component 145 may process the metadata to determine whether the subject matter of the candidate content item corresponds to the input keywords.

Thus, the data processing system 120 can reduce processor utilization, memory utilization, remote procedure calls, and bandwidth usage by using multiple gain adjustment thresholds to tune the keyword selection process used to generate input for the content selection process and, as a result, improve the content selection process itself.

Figure 2:
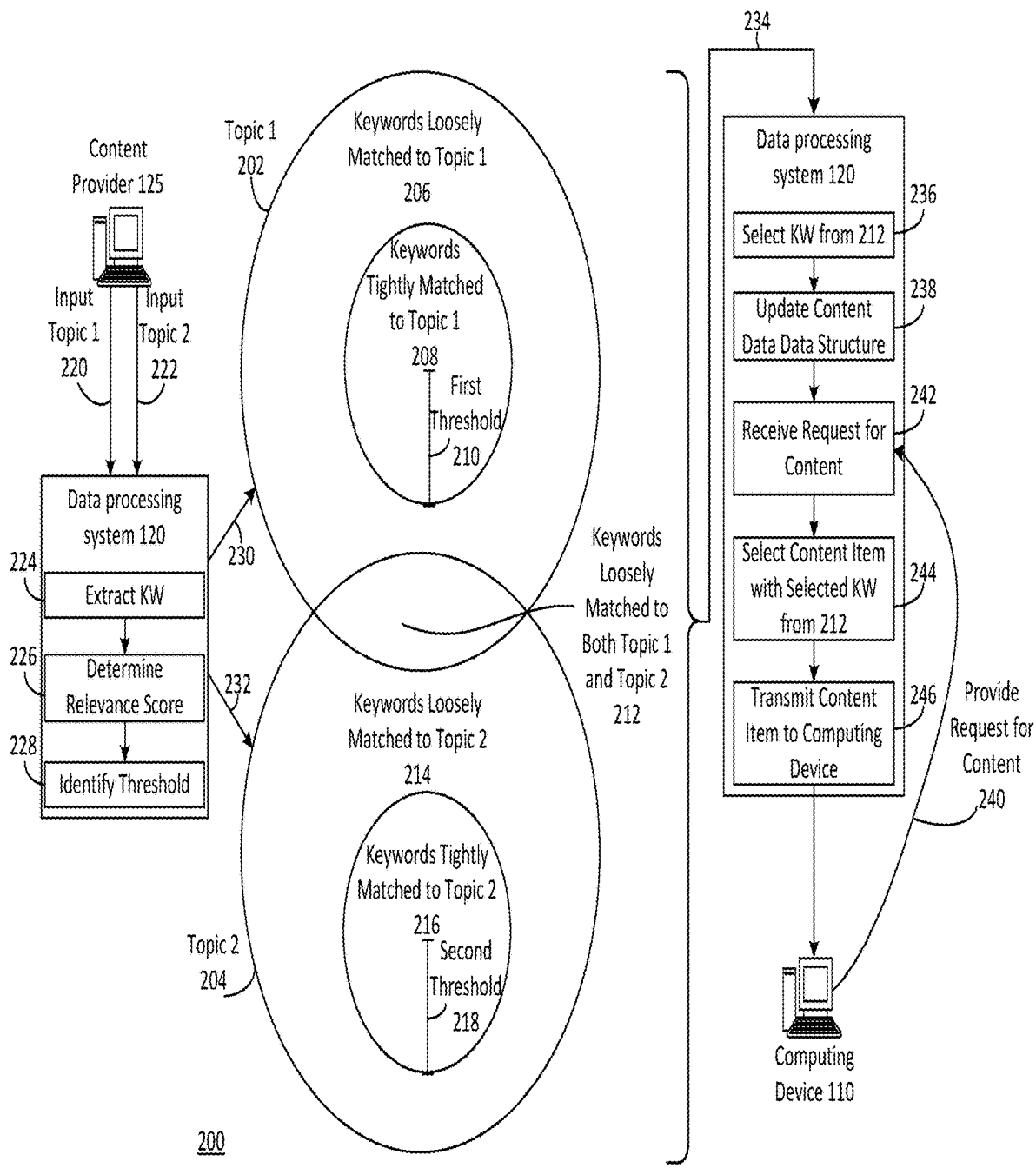
FIG. 2 is an illustration of an operational flow diagram of a system to adjust gain in content selection infrastructure.

FIG. 2 is an illustration of an operational flow diagram of a system to adjust gain in content selection infrastructure. The operational flow of diagram 200 can be performed by, or include, one or more component or element of system 100 or system 500. As illustrated in diagram 200, a content provider device 125 can provide a first input topic at ACT 220 and a second input topic at ACT 222. The content provider device 125 can provide an indication of topic 1 and topic 2, a seed keyword, or select topic 1 and topic 2 from a list of topics provided via a graphical user interface of the data processing system 120.

The data processing system 120 can receive topic 1 and topic 2 via ACT 220 and ACT 222, respectively. At ACT 224, the data processing system 120 can extract keywords for one or more topics. For example, the data processing system 120 can extract keywords for topic 1 and extract keywords for topic 2. Extracting keywords can include identifying one or more keywords that are related or relevant to the topic input at ACT 220, for example. At ACT 226, the data processing system 120 can determine one or more relevance scores. The data processing system 120 can determine a single topic relevance score, an aggregated relevance score, or a bucketized relevance score. At ACT 228, the data processing system 120 can identify thresholds used to group, categorize or otherwise determine a level of relevance of a keyword to either a single topic or multiple topics.

At ACT 230, the data processing system 120 can generate a graph for topic 1 (202). At ACT 232, the data processing system 120 can generate a graph for topic 2 (204). The data processing system 120 can generate these graphs in memory without rendering them for display. The data processing system 120 can perform the functions without generating the graphs 202 and 204.

For example, the diagram 200 illustrates a first topic 202 and a second topic 204. The first topic 202 can overlap with the second topic 204, as illustrated in portion 212. The first topic 202 can include first keywords 206 that are loosely matched to the first topic 202. The first topic 202 can include second keywords 208 that are tightly matched to the first topic 202. The data processing system 120 can determine whether keywords are tightly or loosely matched to the first topic 202 based on one or more thresholds (e.g., as identified at ACT 228). For example, the data processing system 120 can determine which keywords are tightly matched to topic 202 based on threshold 210 (e.g., gain adjustment threshold or first threshold). A threshold can also be used to determine which keywords are loosely matched to topic 202. The threshold 210 can be illustrated as a radius of a circle comprising the tightly matched keywords 208.

Loosely matched keywords 206 may not be tightly matched to topic 202 because their relevance score may not satisfy the first threshold 210. However, the relevance score of the loosely matched keywords 206 may satisfy a threshold that can be illustrated as a radius of the circle formed by topic 202. The loosely matched threshold can be a baseline threshold, such as greater than 0. Thus, the data processing system 120 can use single-topic relevance scores for the keywords and the topic and compare the single-topic relevance scores with the single-topic threshold to identify which keywords fall within 206 and which keywords fall within 208.

The second topic 204 can include third keywords 214 that are loosely matched to the second topic 204 based on a baseline threshold. The second topic 204 can include fourth keywords 216 that are tightly matched to the second topic 202. The data processing system 120 can determine whether keywords are tightly or loosely matched to the first topic 204 based on a second threshold 218 (e.g., gain adjustment threshold). The second threshold 218 can be different from the first threshold 210. The first and second thresholds can be single-topic thresholds.

The data processing system can identify keywords 212 that are loosely matched to both the first topic 202 and the second topic 204. For example, the data processing system 120 can use multi-topic aggregate relevance scores for the keywords compare the aggregate relevance scores with a multi-topic threshold (e.g., gain adjustment threshold) to identify which keywords fall within 212. The data processing system 120 can select keywords 212 as candidates for inclusion in the content selection process because the keywords 212 are related to both the first and second topics 202 and 204. The data processing system 120 can also select keywords 208 and 216 for inclusion in the content selection process as they may be tightly related to the first and second topics, respectively.

For example, at ACT 234, the data processing system 120 can receive data regarding the tightly matched keywords 208 and 216, loosely matched keywords 206 and 214, and the keywords that are loosely matched to both topic and topic 2 (212). At ACT 236, the data processing system 120 can select one or more keywords from the set of keywords that are loosely matched to both topic 1 and topic 2 (212). The data processing system 120 can provide the keywords to a content provider device 125, and prompt the content provider device 125 (or end user thereof) for a selection of one or more keywords. At ACT 238, the data processing system 120 can update a content data data structure (e.g., content data data structure 151 stored in data repository 150 illustrated in FIG. 1) to include the selected keyword. The data processing system 120 can associate the keyword selected from 212 with one or more content items provided by the content provider 125 (e.g., via a configuration component 140).

At ACT 240, a computing device 110 accessing a resource or web page via a network can initiate or trigger a request for content, which can be provided to the data processing system 120. The request for content can be transmitted by the computing device 110 to the data processing system via a network (e.g., network 105). The request for content can be transmitted by a publisher of the resource or web page accessed by the computing device 110 (e.g., content publisher device 115).

At ACT 242, the data processing system 120 can receive the request for content. At ACT 244, the data processing system 120 can execute or perform a real-time content selection process and select the content item associated with the keyword selected from 212. At ACT 246, the data processing system 120 can transmit the content item selected using the keyword from 212 to the computing device 110. The computing device 110 can receive the selected content item and render it for display or otherwise execute or present the content item.

Thus, gain adjustment can refer to setting a single-topic relevance score threshold (e.g., 210 or 218) and a multi-topic (or aggregated) relevance score threshold used to generate a set of keywords 212 that are loosely matched to both topic 1 and topic 2. By increasing the threshold 210, the data processing system 120 may determine that fewer keywords are tightly matched to topic 1, thereby decreasing the number of keywords in the set 208. However, increasing the threshold 210 may, in turn, increase the number of keywords 206 that are loosely matched to topic 202, which may increase the number of keywords 212 that are loosely matched to both topic 1 and topic 2. Similarly, adjusting threshold 218 can increase or decrease the number of keywords 214 that are loosely matched to topic 2. The data processing system 120 can further adjust an aggregate relevancy threshold to control how the set of keywords 212 is generated. For example, a keyword having a multi-topic relevance score that satisfies a multi-topic threshold can be included in the set of keywords 212. The data processing system 120 can, therefore, adjust both a single-topic gain and multi-topic gain. The gain adjustment component can adjust the single-topic and multi-topic gains to facilitate selecting parameters that can improve the efficiency and performance of the content selection infrastructure, while reducing remote procedure calls, pagination, memory utilization, and processor utilization. For example, if the data processing system receives a selection of two or more topics, the data processing system can determine to include fringe keywords (e.g., keywords 206 and 214) only if the fringe keywords are related to multiple selected topics (e.g., keywords 212). Thus, the data processing system of the present solution can reduce the number of search, browse, and continuation queries content provider's need to commit in order to find the appropriate list of keywords for their content selection process. This reduces network requests as well as server side CPU and memory costs. Additionally, since this data processing system 120 can narrow the set of recommended keywords (e.g., to set 212), the data processing system can also reduce response size which further reduces network bandwidth utilization as well as CPU and memory utilization on the client device. The data processing system 120 can filter out keywords 208 that are tightly matched to topic 1, and filter out keywords 216 that are tightly matched to topic 2, in order to identify a subset of loosely matched keywords that are loosely matched to both topic 1 and topic 2 (e.g., set of keywords 212).

Figure 3:
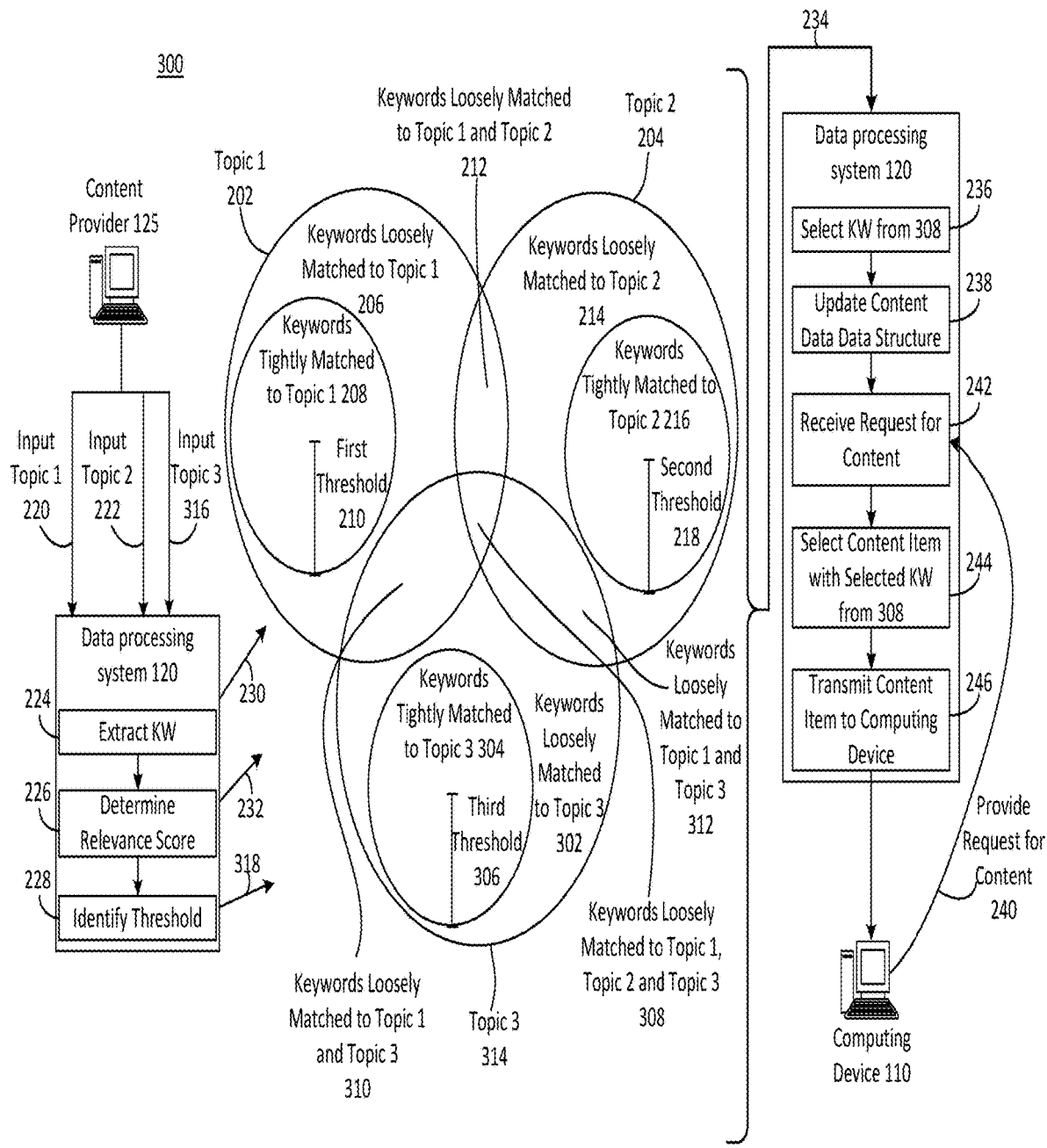
FIG. 3 is an illustration of an operational flow diagram of a system to adjust gain in content selection infrastructure.

FIG. 3 is an illustration of an operational flow diagram of a system to adjust gain in content selection infrastructure. The operational flow of diagram 300 can be performed by, or include, one or more component or element of system 100, diagram 200, or system 500. As illustrated in diagram 300, a content provider device 125 can provide a first input topic at ACT 220, a second input topic at ACT 222, and a third input topic at ACT 316. The content provider device 125 can provide an indication of topic 1, topic 2, and topic 3, a seed keyword, or select topic 1, topic 2, or topic 3 from a list of topics provided via a graphical user interface of the data processing system 120.

The data processing system 120 can receive topic 1, topic 2, and topic 3 via ACT 220, ACT 222, and ACT 316, respectively. At ACT 224, the data processing system 120 can extract keywords for one or more topics. For example, the data processing system 120 can extract keywords for topic 1, extract keywords for topic 2, and extract keywords for topic 3. Extracting keywords can include identifying one or more keywords that are related or relevant to the topic input at ACT 220, for example. At ACT 226, the data processing system 120 can determine one or more relevance scores. The data processing system 120 can determine a single topic relevance score, an aggregated relevance score, or a bucketized relevance score. At ACT 228, the data processing system 120 can identify thresholds used to group, categorize or otherwise determine a level of relevance of a keyword to either a single topic or multiple topics.

At ACT 230, the data processing system 120 can generate a graph for topic 1 (202). At ACT 232, the data processing system 120 can generate a graph for topic 2 (204). ACT 318, the data processing system 120 can generate a graph for topic 3 (314). The data processing system 120 can generate these graphs in memory without rendering them for display. The data processing system 120 can perform the functions without generating the graphs 202, 204 and 314

The diagram 300 illustrates the first topic 202, the second topic 204, and a third topic 314. The third topic 314 includes keywords 302 that are loosely matched to the third topic 314, and keywords 304 that are tightly matched to the third topic 314 based on the single-topic threshold 306 (e.g., third threshold) and corresponding single-topic relevance scores. The third topic 314 can further overlap with the first topic 202 and the second topic 204. In some cases, keywords 310 of the third topic 314 can only overlap with the first topic 202. In some cases, keywords 312 of the third topic 314 can only overlap with the second topic 204. In some cases, keywords 308 can overlap with all three topics 202, 204 and 314. The data processing system 120 can determine that keywords 308 are relevant to all three topics based on the multi-topic aggregate relevancy score of the keywords 308 satisfying a multi-topic gain adjustment threshold established for portion 308.

For example, at ACT 234, the data processing system 120 can receive data regarding the tightly matched keywords 208, 216, and 304, loosely matched keywords 206, 214 and 302, and the keywords that are loosely matched to all three topics (308). At ACT 236, the data processing system 120 can select one or more keywords from the set of keywords that are loosely matched to all three topics 308. The data processing system 120 can provide the keywords to a content provider device 125, and prompt the content provider device 125 (or end user thereof) for a selection of one or more keywords. At ACT 238, the data processing system 120 can update a content data data structure (e.g., content data data structure 151 stored in data repository 150 illustrated in FIG. 1) to include the selected keyword. The data processing system 120 can associate the keyword selected from 212 with one or more content items provided by the content provider 125 (e.g., via a configuration component 140).

At ACT 240, a computing device 110 accessing a resource or web page via a network can initiate or trigger a request for content, which can be provided to the data processing system 120. The request for content can be transmitted by the computing device 110 to the data processing system via a network (e.g., network 105). The request for content can be transmitted by a publisher of the resource or web page accessed by the computing device 110 (e.g., content publisher device 115).

At ACT 242, the data processing system 120 can receive the request for content. At ACT 244, the data processing system 120 can execute or perform a real-time content selection process and select the content item associated with the keyword selected from 308. At ACT 246, the data processing system 120 can transmit the content item selected using the keyword from 308 to the computing device 110. The computing device 110 can receive the selected content item and render it for display or otherwise execute or present the content item.

Figure 4:
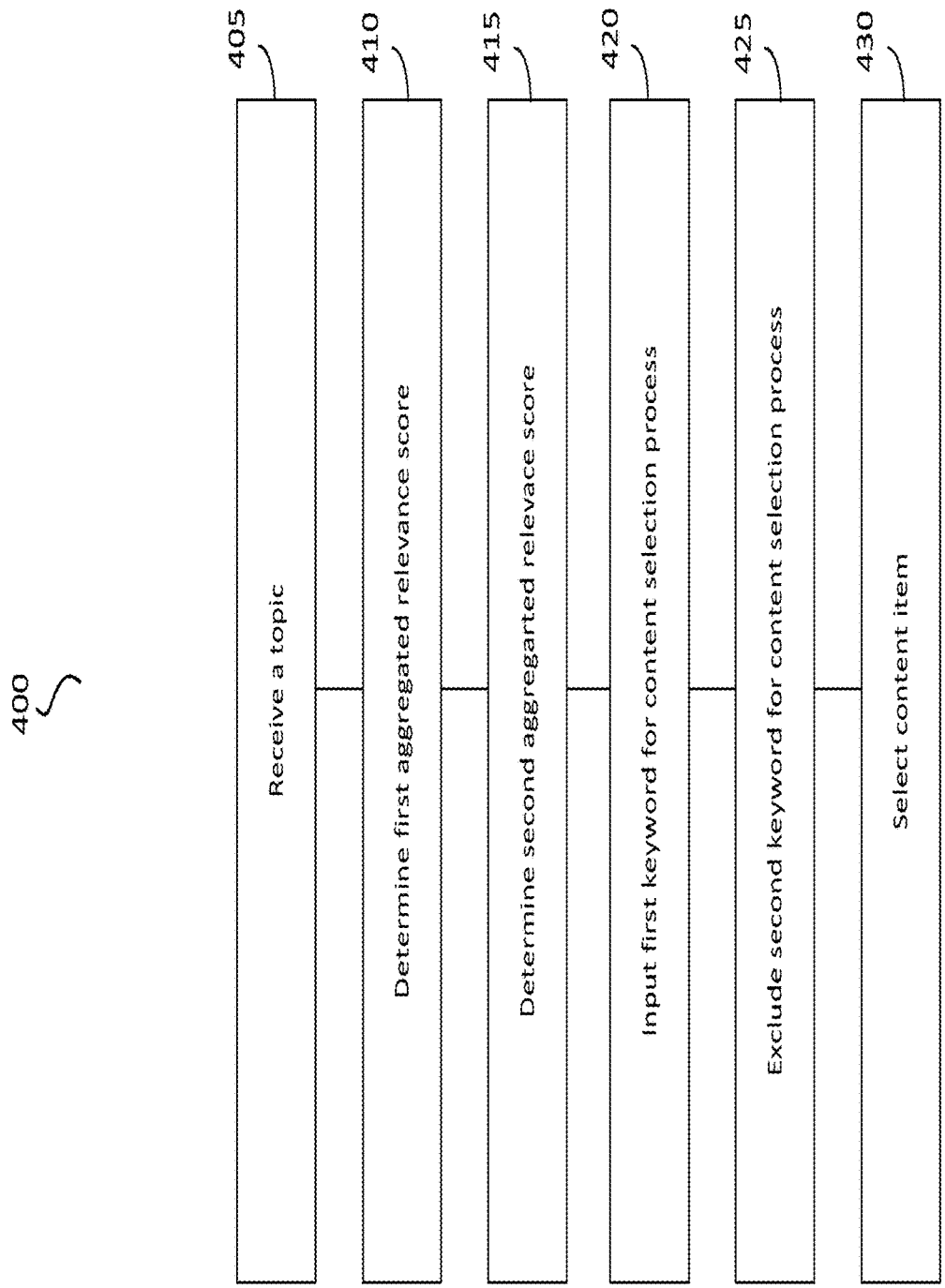
FIG. 4 is an illustration of a method of adjusting gain in content selection infrastructure.

FIG. 4 is an illustration of a method of adjusting gain in content selection infrastructure. The method 400 can include a computer-implemented method (or data processing system) of adjusting gain in content selection infrastructure comprising at least one processor in communication with at least one memory. The method 400 can be performed via one or more system or component illustrated in FIG. 1, FIG. 2, or FIG. 5, including, e.g., a data processing system, interface, gain adjustment component, configuration component, content selector 145, data repository, content provider, content publisher, network, computing device.

At ACT 405, a data processing system can receive one or more topics, such as a first topic or a second topic. In some cases, the data processing system can receive one or more seed keywords and extract the one or more seed keywords to identify one or more topics. The data processing system can identify a topic as a concept generated or defined by a semantic analysis engine. A topic can include one or more keywords. The topic can be defined in by a crowd-sourced hierarchical graph. Each topic can include or have a unique identifier that identifies the topic. The identifier can include an alphanumeric identifier.

The data processing system can determine relevance scores for the identified keywords for each topic. For example, at ACT 410 the data processing system can determine a first aggregated relevance score for the first keyword based on a single-topic relevance score for each of the first topic and the second topic. At ACT 415, the data processing system can determine a second aggregated relevance score. The data processing system can determine the second aggregated relevance score for the second keyword based on a single-topic relevance score for each of the first topic and the second topic.

The data processing system can determine a single-topic relevance score for each keyword and topic pair. As a result, the data processing system can determine a plurality of single-topic relevance scores for a single keyword as there may be multiple topics received as ACT 405. The data processing system can combine the single-topic relevance scores to generate an aggregate multi-topic relevance score for the keyword. Thus, the keyword can have a plurality of single-topic relevance scores, but a single aggregated multi-topic relevance score. The data processing system can combine the single-topic relevance scores using various techniques, such as additive, multiplicative or other technique or function.

The data processing system can determine to generate the aggregate relevance score for a keyword based on the keyword having a single-topic relevance score that is greater than a threshold, such as a first gain adjustment threshold, for each of the plurality of topics. For example, if the data processing system receives two topics at ACT 405, the data processing system can determine to proceed with generating the aggregate relevance score if the first keyword has a single topic relevance score greater than a first gain adjustment threshold for each of the first topic and the second topic. However, if the keyword has a single-topic relevancy score that is less than the first gain adjustment threshold, the data processing system can exclude the keyword from further downstream processing to reduce computing resource utilization.

The data processing system can manipulate or transform the single-topic relevance scores prior to combining the relevance scores (or in a single operation when combining the single-topic relevance scores to generate the aggregate relevance score). For example, the data processing system can bucketize the single-topic relevance scores to reduce their granularity. The data processing system can weight the single-topic relevance scores such that certain topics can be more or less heavily weighted.

At ACT 420, the data processing system can select the first keyword for input into a content selection process. The data processing system can select the first keyword based on the first keyword having an aggregate relevance score that satisfies a threshold, such as a second gain adjustment threshold. The data processing system can automatically include the first keyword in the content selection process for the content provider. The data processing system can provide the first keyword as a candidate keyword and prompt a content provider for an indication as to whether to include the first keyword in the content selection process.

At ACT 425, the data processing system can determine to exclude the second keyword from the content selection process. The data processing system can determine to exclude the second keyword based on the second keyword having an aggregate multi-topic keyword score that does not satisfy the gain adjustment threshold. The data processing system can automatically exclude the second keyword, or prompt the content provider for confirmation to exclude the second keyword.

The data processing system can periodically tune the content selection process by identifying multiple topics and keywords, and applying the gain adjustment mechanism to select one or more keywords based on their multi-topic relevance. The data processing system can further periodically adjust the gain of the keyword generation system by increasing or lowering the single-topic threshold or the multi-topic threshold, or adjusting the topic-based weights applied to the relevance scores. By tuning the gain of the system, the present solution can reduce resource utilization by filtering out or excluding keywords from downstream processing, which can save processor utilization, memory utilization, and bandwidth utilization. Furthermore, by the gain adjustment mechanism can improve the content selection process by providing keywords that are relevant to multiple topics.

For example, the first topic can be "refrigerator" and the second topic can be "plumbing or maintenance". The data processing system can identify a keywords such as "installation", "energy efficiency", "ice maker", "water dispenser", "service", "San Jose", "temperature", "repair", or "delivery". The data processing system can determine that keywords "water dispenser" and "repair" are relevant to both topics, while keyword "temperature" and "energy efficiency" is not relevant to the second topic. The data processing system can exclude the keywords "temperature" and "energy efficiency" from further processing based on their single-topic relevance scores with respect to the second topic. The data processing system can further determine that the aggregate relevance score for the keyword "water dispenser" does not satisfy a multi-topic threshold, while the aggregate relevance score for "repair" satisfies the aggregate relevance score. Thus, the data processing system can input the keyword "repair" into the content selection process to facilitate selecting a content item object that corresponds to both the first topic and the second topic.

At ACT 430, the data processing system can select a content item. The data processing system can select the content item using the first keyword. The data processing system can select the content item using the first keyword of the content selection process executed by the content selection infrastructure. The data processing system can select the content item in response to a request received from a client computing device, and provide the selected content item for display on the client computing device.

Figure 5:
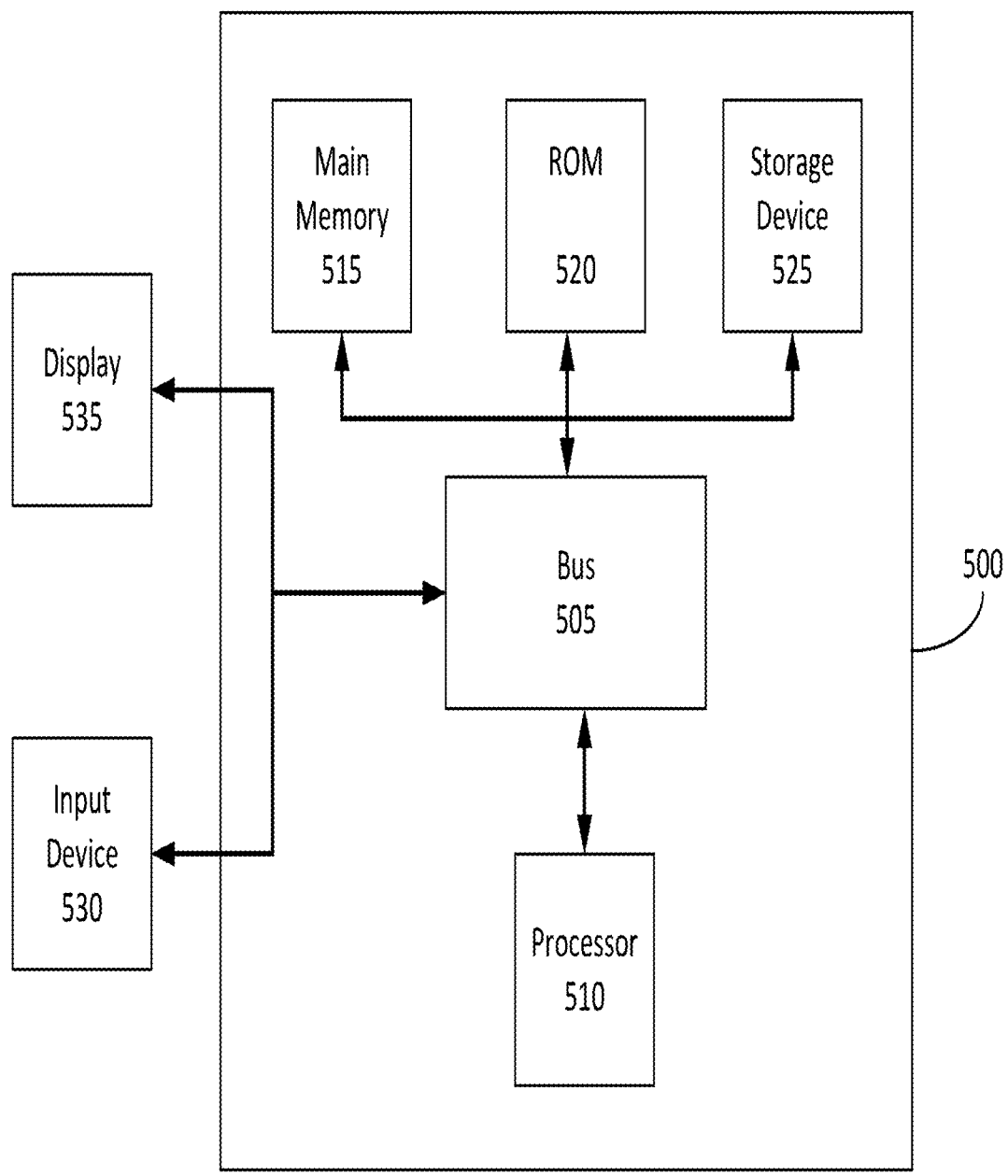
FIG. 5 is a block diagram illustrating an architecture for a computer system that may be employed to implement various elements of the systems shown in FIGS. 1, 2, and 3, and the method shown in FIG. 4.

FIG. 5 is a block diagram of an example computer system 500. The computer system or computing device 500 can include or be used to implement the system 100, or its components such as the data processing system 120. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. The main memory 515 can be or include the data repository 145. The main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid state device, magnetic disk or optical disk, can be coupled to the bus 505 to persistently store information and instructions. The storage device 525 can include or be part of the data repository 145.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the data processing system 120, the client computing device 150 or other component of FIG. 1, for example.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The interface 130, gain adjustment component 135, configuration component 140, content selector component 145 and other data processing system 120 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 120) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 500 can include clients and servers. A client and server are generally remote from each other and typically interact through a communication network (e.g., the network 105). The relationship of client and server arises by virtue of computer programs running on the respective computers and having a client-server relationship to each other. A server can transmit data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 120 from the computing device 110 or the content provider computing device 125 or the content publisher device 115).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the gain adjustment component 135, or the content selector component 145, can be a single component, app, or program, or a logic device having one or more processing circuits, or part of one or more servers of the data processing system 120.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A gain adjustment system for content selection infrastructure, comprising:
   a data processing system including a gain adjustment component and a content selector component executed by at least one processor, the data processing system configured to:
   receive, via an interface, an indication of a seed keyword;
   extract, based on the seed keyword, via a semantic analysis engine accessing a data repository including a plurality of keywords and a plurality of topics, at least one topic;
   receive a selection of a plurality of topics generated by the semantic analysis engine, the plurality of topics including the topic extracted based on the seed keyword;
   determine a first relevance score between a candidate keyword and a first selected topic, and a second relevance score between the candidate keyword and a second selected topic;
   determine a candidate aggregated score based on the first relevance score and the second relevance score;
   identify a threshold based on a metric corresponding to the plurality of topics;
   input, responsive to the candidate aggregated score exceeding the threshold, the candidate keyword into a content selection process executed by the content selection infrastructure; and
   select, via the candidate keyword of a content selection process executed by the content selection infrastructure, in response to a request received from a client computing device, a content item to provide for display on the client computing device.

2. The system of claim 1, wherein the data processing system is further configured to:
   receive, via an interface, an indication of the plurality of topics.

3. The system of claim 1, wherein the data processing system is further configured to:
   receive, via an interface, an indication of the plurality of keywords.

4. The system of claim 1, wherein the data processing system is further configured to:
   retrieve, from a database in memory, the first relevance score and the second relevance score; and
   combine the first relevance score with the second relevance score to generate the candidate aggregated score.

5. The system of claim 1, wherein the data processing system is further to:
   combine the first relevance score with the second relevance score based on an additive technique; and generate the candidate aggregated score based on the first relevance score combined with the second relevance score based on the additive technique.

6. The system of claim 1, wherein the data processing system is further to:
combine the first relevance score with the second relevance score based on a multiplicative technique; and
generate the candidate aggregated score based on the first relevance score combined with the second relevance score based on the multiplicative technique.

7. The system of claim 1, wherein the data processing system is further configured to:
generate a first weighted relevance score based on the first relevance score and a first weight assigned to the first selected topic;
generate a second weighted relevance score based on the second relevance score and a second weight assigned to the second selected topic;
combine the first weighted relevance score with the second weighted relevance score based on a multiplicative technique; and
generate the candidate aggregated score based on the first weighted relevance score combined with the second weighted relevance score based on the multiplicative technique.

8. The system of claim 1, wherein the data processing system is further configured to:
combine the first relevance score with the second relevance score based on a bucketing technique; and
generate the candidate aggregated score based on the first relevance score combined with the second relevance score based on the bucketing technique.

9. The system of claim 1, wherein the data processing system is further configured to:
bucketize the first relevance score to generate a first bucketed relevance score;
bucketize the second relevance score to generate a second bucketed relevance score;
combine the first bucketed relevance score with the second bucketed relevance score based on an additive technique; and
generate the candidate aggregated score based on the first bucketed relevance score combined with the second bucketed relevance score based on the additive technique.

10. The system of claim 1, comprising the data processing system to:
bucketize the first relevance score to generate a first bucketed relevance score;
bucketize the second relevance score to generate a second bucketed relevance score;
combine the first bucketed relevance score with the second bucketed relevance score based on a multiplicative technique; and
generate the candidate aggregated score based on the first bucketed relevance score combined with the second bucketed relevance score based on the multiplicative technique.

11. The system of claim 1, comprising the data processing system to:
set the threshold based on a number of the plurality of topics.

12. The system of claim 1, comprising the data processing system to:
set the threshold based on a weight of each of the plurality of topics.

13. A method of adjusting gain in content selection infrastructure, comprising:
receiving, by a data processing system including a gain adjustment component and a content selector component executed by at least one processor, via an interface, an indication of a seed keyword;
extracting, by a semantic analysis engine accessing a data repository including a plurality of keywords and a plurality of topics, based on the seed keyword, at least one topic;
receiving, by the data processing system, a selection of a plurality of topics generated by the semantics analysis engine, the plurality of topics including the topic extracted based on the seed keyword;
determining, by the data processing system, a first relevance score between a candidate keyword and a first selected topic, and a second relevance score between the candidate keyword and a second selected topic;
determining, by the data processing system, a candidate aggregated score based on the first relevance score and the second relevance score;
identifying, by the data processing system, a threshold based on a metric corresponding to the plurality of topics;
inputting, by the data processing system responsive to the candidate aggregated score exceeding the threshold, the candidate keyword into a content selection process executed by the content selection infrastructure; and
selecting by the data processing system, via the candidate first keyword of the content selection process executed by the content selection infrastructure, in response to a request received from a client computing device, a content item to provide for display on the client computing device.

14. The method of claim 13, comprising:
receiving, by the data processing system via an interface, an indication of the plurality of topics.

15. The method of claim 13, comprising
receiving, by the data processing system via an interface, an indication of the plurality of keywords.

16. The method of claim 13, comprising:
retrieving, by the data processing system from a database in memory, the first relevance score and the second relevance score; and
combining, by the data processing system, the first relevance score with the second relevance score to generate the candidate aggregated score.

17. The method of claim 13, comprising:
combining, by the data processing system, the first relevance score with the second relevance score based on an additive technique; and
generating, by the data processing system, the candidate aggregated score based on the first relevance score combined with the second relevance score based on the additive technique.

18. The method of claim 13, comprising:
combining, by the data processing system, the first relevance score with the second relevance score based on a multiplicative technique; and
generating, by the data processing system, the candidate aggregated score based on the first relevance score combined with the second relevance score based on the multiplicative technique.

19. The method of claim 13, comprising
generating, by the data processing system, a first weighted relevance score based on the first relevance score and a first weight assigned to the first selected topic;

generating, by the data processing system, a second weighted relevance score based on the second relevance score and a second weight assigned to the second selected topic;

combining, by the data processing system, the first weighted relevance score with the second weighted relevance score based on a multiplicative technique; and generating, by the data processing system, the candidate aggregated score based on the first weighted relevance score combined with the second weighted relevance score based on the multiplicative technique.

20. The method of claim 13, comprising:

combining, by the data processing system, the first relevance score with the second relevance score based on a bucketing technique; and generating, by the data processing system, the candidate aggregated score based on the first relevance score combined with the second relevance score based on the bucketing technique.

* * * * *